UNITED STATES PATENT OFFICE 2,083,181

COMPOSITION OF MATTER FOR DYEING ANIMAL FIBERS

Henri Zweifel, Binningen, near Basel, and Charles Graenacher, Fritz Grether, and Fritz Straub, Basel, Switzerland, assignors to "Society of Chemical Industry in Basle", Basel, Switzerland No Drawing. Application July 16, 1934, Serial No. 735,538. In Switzerland August 12, 1933

6 Claims. (Cl. 8—6)

There is known a series of lyophile unsulfonated dispersing agents characterized on the one hand by containing in the same cation at least one basic nitrogen atom and at least one aliphatic radical consisting of at least 8 carbon atoms, the term aliphatic radical comprising both open and cyclic chains, such as inter alia decyl, dodecyl, heptadecyl radicals, or the radicals which correspond to the naphthene hydrocarbons, and on the other hand by their tendency to combine with dyestuffs containing sulfo-groups.

Such products are, for example, the trimethyl-ammonium-sulfomethylate of mono-stearoyl-para-phenylenediamine of the formula

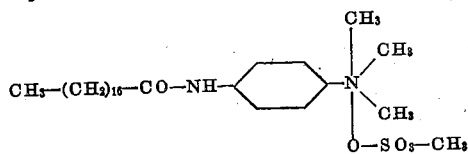

(cf. German Patent No. 559,500, Example 10), the trimethyl-ammoniumsulfomethylate of mono-oleyl-para-phenylenediamine, the trimethylammoniumsulfomethylate of mono-stearoylethylenediamine, the trimethylammonium sulfomethylate of mono-oleylethylenediamine of the formula

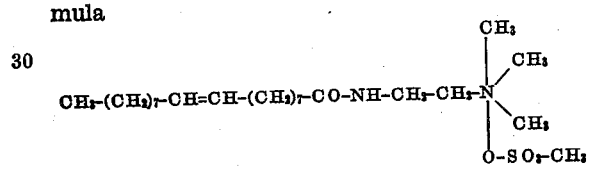

the hydrochloride of diethylcetylamine of the formula

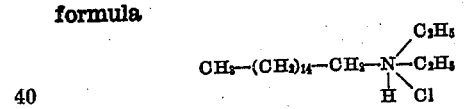

(cf. Reychler, Chemisches Zentralblatt, published by the Deutsche Chemische Gesellschaft, 1913, II, page 1377, line 2), the dimethyloctodecylamine-hydrochloride of the formula

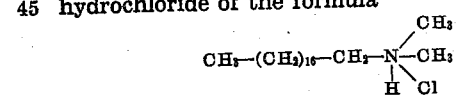

the sulfomethylate of octodecyltrimethylammonium, the hydrochloride of pentadecyldihydroimidazole of the formula

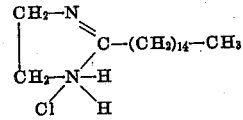

the cetylpyridinium chloride or bromide: further unsulfonated cyclic amidines, which are obtained by mono- or di-alkylating or di-benzylating or also by benzylating and alkylating such benzimidazoles whose $\mu$-substituent consists of a chain of at least 7 carbon atoms. Such products are for example the $\mu$-heptadecyl-N-ethyl-benzimidazol hydrochloride of the formula

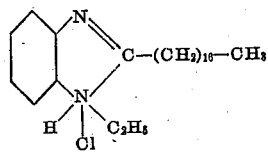

the $\mu$-heptadecenyl-N:N-dibenzylbenzimidazolium chloride of the formula

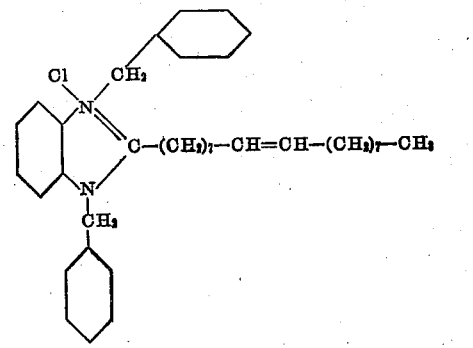

the $\mu$-heptadecyl-N-hydroxyethyl-benzimidazole hydrochloride etc. Such products are also compounds in which the nitrogenous and the aliphatic radicals containing at least 8 carbon atoms are linked with each other in the manner of an ester or an ether. Such products are, for instance, the mixed ether of cetyl-alcohol and N-hydroxymethylpyridinium chloride, the ester from stearic acid and dimethyl- or diethylaminoethanol of the formula

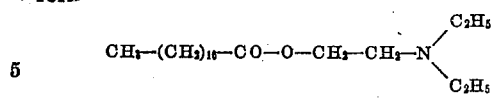

the stearylcholine chloride and the corresponding benzyl compound of the formula

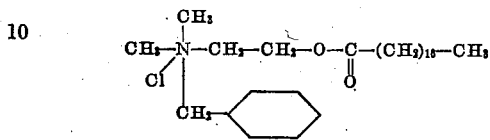

the palmitic acid ester of 1-hydroxy-phenyl-3-trimethylammonium chloride of the formula

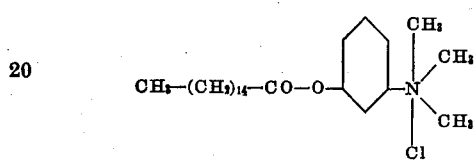

the stearic acid ester of hydroxy-ethylpyridinium chloride of the formula

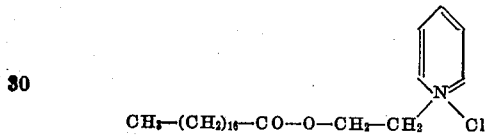

the hydrochloride of diethylaminoethyloctodecylcarbonate, the stearic acid ester of the addition product of glycerine-mono-chlorhydrin of the formula

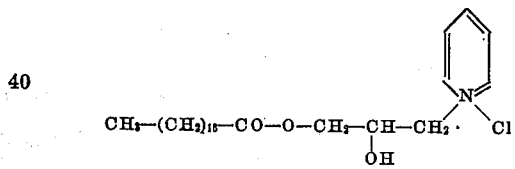

or of $\alpha, \alpha'$-glycerinedichlorhydrin and pyridine or the like. In all these compounds the stearic acid radical and the palmitic acid radical may be exchanged for other acid radicals, for instance that of oleic acid, capric acid, lauric acid, myristic acid or ricinoleic acid. Furthermore, the alcoholic radical, such as that of cetyl alcohol, may be replaced by the radical of the alcohol corresponding with one or other of the aforesaid acids, such as the oleyl alcohol. Finally, derivatives of complex amines may be used, such as derivatives of diethylenetriamine, triethylenetetramine or the like. All these products neither contain sulfo-groups nor carboxyl-groups, but in the form of the salts which they form with acids, due to the presence of the basic N-atom, they are lyophile. If they are quaternary ammonium compounds, they may be lyophile also in the form of the free bases.

These products are valuable assistants for dyeing a group of dyestuffs consisting of the metal compounds, particularly of the chromium compounds of mordant dyestuffs, which are dyed from a bath acid with sulfuric acid. However, if these dispersing agents are used in such proportion as is usual for textile assistants, that is to say in proportions of 1–10 per cent. of the goods to be dyed, there are obtained useless, and in many cases, directly injurious results. If they are used in essentially smaller proportions than has hitherto been usual with such assistants they improve the affinity of the dyestuff in that there are obtained, for example, more vivid or fuller tints than without the assistant.

The dyeing with the assistants coming into consideration here consists in adding to the dye-bath a small proportion, i. e. less than 1 per cent. calculated on the weight of the fiber to be dyed, of one of the aforesaid dispersing agents. As a rule quantities of 0.1 to 0.2 per cent. will suffice. With certain dispersing agents or with certain dyestuffs it may also be of advantage to use more of the dispersing agent, for example 0.5 to 0.9 per cent.

The present invention now relates to the production of new compositions of matter which are particularly valuable in the dyeing of metal compounds of mordant dyestuffs. The method of producing the new compositions of matter consists in mixing a small proportion of one of the lyophile dispersing agents in question with the dyestuffs characterized above which are dyed advantageously in the presence of small quantities of such dispersing agents. The dyestuff preparation thus obtained, when used in an acid dye-bath, yields the same effects as the dye-bath does when the assistant has been added to it. Metal compounds of mordant dyestuffs, particularly chromium compounds of azo-dyestuffs have been described in many patent specifications and other publications. Reference may be made to specifications Nos. 1,227,406; 1,221,849; 1,402,350; 1,488,411; 1,551,073; 1,656,844; 1,626,168; 1,626,169; 1,903,884; 1,914,052. Such dyestuffs have become known in literature as Neolan dyestuffs.

The following example illustrates the invention, the parts being by weight:—

*Example*

50 parts of the chromium compound of the azo-dyestuff from the nitrated diazo-compound from 1-amino-2-hydroxynaphthalene-4-sulfonic acid and $\beta$-naphthol (compare Patent 1,914,052) are dissolved in 100 parts of hot water and this dyestuff solution is mixed gradually, while vigorously stirring and at a temperature of 60° C., with 7.5 parts of a solution of 10 per cent. strength of the mixture of the hydrochlorides of N-dihydroxypropylbenzimidazoles, which is obtained by treating with glycerin chlorhydrin the benzimidazole mixture, highly alkylated at the $\mu$-carbon atom, which mixture is produced by heating orthophenylenediamine with a mixture of fats from hydrogenized fish oil, coconut oil and olive oil, it being therefore a question of a mixture consisting chiefly of the following three benzimidazoles:—

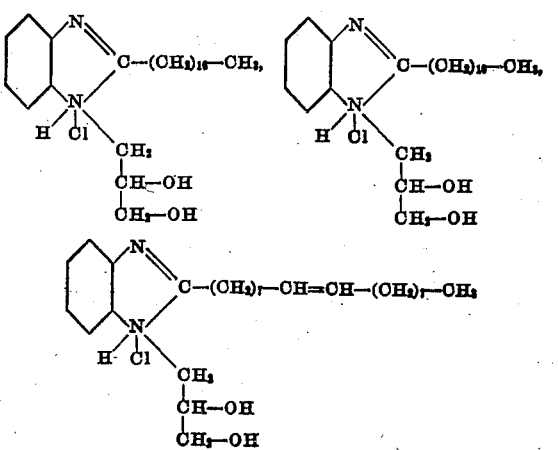

When the addition is completed, the solution of the mixture is evaporated to dryness in a vacuum and the dyestuff constituting the residue is pulverized.

This dyestuff preparation differs from the dyestuff from which it was produced in that it can be used with a smaller proportion of sulfuric acid and at the same time yields dyeings of enhanced depth, because the dye-bath prepared with the preparation then contains that small proportion of the auxiliary which has the favorable effect.

The manufacture of the preparation and of the chromiferous azo-dyestuff may be united into one operation.

Similar results are obtained with other chromium compounds, for example the chromium compound of the dyestuff from diazotized 4-chloro-2-amino-1-hydroxybenzene-4-sulfonic acid and 2:4-dihydroxy-quinoline, of the dyestuff from diazotized 4-methyl-2-amino-1-hydroxybenzene-6-sulfonic acid and β-naphthol, of the dyestuff from diazotized 2-amino-4:6-dinitrophenol and 1-aminonaphthalene-4-sulfonic acid, of the dyestuff from diazotized 2-amino-4-nitro-1-hydroxybenzene-6-sulfonic acid and β-naphthol, of the dyestuff from diazotized 2-amino-1-hydroxynaphthalene-4:8-disulfonic acid and β-naphthol, the chromium compound of the dyestuff from diazotized 1-amino-2-hydroxynaphthalene-4-sulfonic acid and phenylmethylpyrazolone, the chromium compound of the dyestuff from diazotized 1-hydroxy-2-amino-6-nitrobenzenesulfonic acid and β-naphthol (compare specification No. 1,626,168), the chromium compound of the azo-dyestuff from diazotized 2-amino-5-chlorobenzoic acid and the methyl pyrazolone from 1-amino-2:5-dichlorobenzene-4-sulfonic acid, etc.

As lyophile dispersing agent one may also employ the condensation product from stearyl acidchloride and asymmetrical N-diethyl-ethylenediamine, the condensation product from oleic acid chloride and asymmetrical N-diethyl-ethylenediamine, or the mixture of N-hydroxyethylbenzimidazoles which is obtained by treating with ethylene chlorhydrin the benzimidazole mixture highly alkylated at the μ-carbon atom, which mixture is itself produced by heating orthophenylenediamine with hydrogenated fish oil etc.

The compositions of matter of the preceding example may vary with regard to their content of lyophile dispersing agent. As a rule it is advisable to use less than 10 per cent. of the weight of the dyestuff of the lyophile dispersing agent. Amounts which do not exceed 5 per cent. have proved particularly successful, as for example 5 per cent., 4 per cent., 3 per cent., 2 per cent. or 1 per cent. The amounts depend on the nature of the dyestuff.

What we claim is:—

1. A composition of matter, characterized by a content of a metal compound of a mordant-dyeing azo-dyestuff, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

2. A composition of matter, characterized by a content of a chromium compound of a mordant-dyeing azo-dyestuff, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

3. A composition of matter, characterized by a content of a chromium compound of a mordant-dyeing ortho-hydroxyazo-dyestuff, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

4. A composition of matter, characterized by a content of a metal compound of a mordant-dyeing azo-dyestuff, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

5. A composition of matter, characterized by a content of a chromium compound of a mordant-dyeing azo-dyestuff, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

6. A composition of matter, characterized by a content of a chromium compound of a mordant-dyeing ortho-hydroxyazo-dyestuff, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

HENRI ZWEIFEL.
CHARLES GRAENACHER.
FRITZ GRETHER.
FRITZ STRAUB.